US012498288B2

(12) United States Patent
Holland et al.

(10) Patent No.: US 12,498,288 B2
(45) Date of Patent: Dec. 16, 2025

(54) SYSTEM AND METHOD FOR DETECTING COOLANT LEAKS IN A SERVER SYSTEM

(71) Applicant: LENOVO GLOBAL TECHNOLOGY (UNITED STATES) INC., Morrisville, NC (US)

(72) Inventors: Jeffrey S. Holland, Morrisville, NC (US); Arvind Modekurti, Morrisville, NC (US)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 810 days.

(21) Appl. No.: 17/710,884

(22) Filed: Mar. 31, 2022

(65) Prior Publication Data

US 2023/0314271 A1 Oct. 5, 2023

(51) Int. Cl.
*G01M 3/04* (2006.01)
*G06F 1/28* (2006.01)
(52) U.S. Cl.
CPC .............. *G01M 3/045* (2013.01); *G06F 1/28* (2013.01)
(58) Field of Classification Search
None
See application file for complete search history.

(56) References Cited

U.S. PATENT DOCUMENTS

| | | | | |
|---|---|---|---|---|
| 10,477,726 B1* | 11/2019 | Enright | ................ | H05K 7/203 |
| 10,704,983 B1* | 7/2020 | Tian | ...................... | H01R 12/75 |
| 10,852,789 B1* | 12/2020 | Bender | ..................... | G06F 1/20 |
| 12,007,305 B2* | 6/2024 | Chigullapalli | ..... | H05K 7/20272 |
| 12,133,361 B2* | 10/2024 | Patel | ..................... | G06F 9/5088 |
| 12,216,025 B2* | 2/2025 | Gao | ................... | H05K 7/20254 |
| 12,317,449 B2* | 5/2025 | Chen | ................... | H05K 7/20254 |
| 2012/0160111 A1* | 6/2012 | Hozumi | ................ | F24C 15/327 99/474 |
| 2014/0251583 A1* | 9/2014 | Eriksen | .............. | H05K 7/20772 165/104.33 |
| 2017/0284173 A1* | 10/2017 | Newell | ................ | E21B 33/076 |
| 2020/0163251 A1* | 5/2020 | Chopra | ..................... | G06F 1/20 |
| 2021/0389205 A1* | 12/2021 | Chen | ....................... | G06F 1/206 |
| 2022/0113219 A1* | 4/2022 | Stumpf | ................. | H05K 7/20272 |
| 2022/0159872 A1* | 5/2022 | Tung | ..................... | H05K 7/203 |
| 2022/0408610 A1* | 12/2022 | Gao | ................... | H05K 7/20781 |
| 2023/0061298 A1* | 3/2023 | Gao | ....................... | G01M 3/38 |
| 2023/0063710 A1* | 3/2023 | Gao | .................. | H05K 7/20509 |
| 2023/0068535 A1* | 3/2023 | Chen | ......................... | G06F 1/20 |
| 2023/0280228 A1* | 9/2023 | Ting | .......................... | G06F 1/20 700/282 |
| 2023/0314271 A1* | 10/2023 | Holland | .................... | G06F 1/30 73/52 |

* cited by examiner

*Primary Examiner* — Fekadeselassie Girma

(57) ABSTRACT

Detecting coolant leaks in a server system including receiving, by a controller in the server system with nodes stacked vertically, a voltage fault alert from a first node; receiving, by the controller in the server system with nodes stacked vertically, a voltage fault alert from a second node located below the first node; and upon receiving the voltage fault alert from the first node and the voltage fault alert from the second node, powering down, by the controller, one or more nodes located below the second node.

19 Claims, 8 Drawing Sheets

SYSTEM AND METHOD FOR DETECTING COOLANT LEAKS IN A SERVER SYSTEM

BACKGROUND

Field of the Invention

The field of the invention is data processing, or, more specifically, methods, apparatus, and products for detecting coolant leaks in a server system.

Description of Related Art

In current computing environments, servers or nodes are mounted vertically in racks in a chassis. Servers generate heat and when servers are packed closely together, they generate a lot of heat. The system is cooled using liquid such as water. When the coolant leaks, the servers or nodes can experience voltage faults and can be damaged. Leaks are detected using a drip pan underneath the chassis and a sensor such as a float or are detected by using a rope that is snaked through the rack. It is difficult to snake the rope around each and every computer in the chassis so a leak may be missed. By the time a drip pan has filled with enough water to be detected, a significant leak has occurred. Detecting leaks more quickly and accurately is desired.

SUMMARY

Methods, systems, and apparatus for detecting coolant leaks in a server system are disclosed in this specification. Detecting coolant leaks in a server system includes receiving, by a controller in the server system with nodes stacked vertically, a voltage fault alert from a first node; receiving, by the controller in the server system with nodes stacked vertically, a voltage fault alert from a second node located below the first node; and upon receiving the voltage fault alert from the first node and the voltage fault alert from the second node, powering down, by the controller, one or more nodes located below the second node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
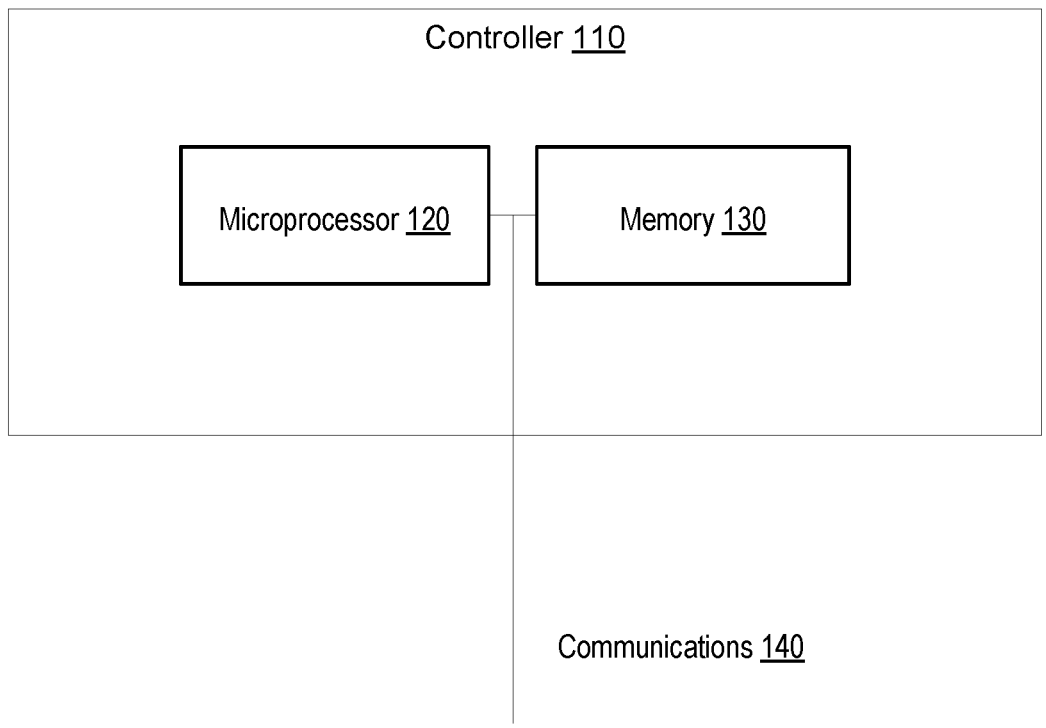
FIG. 1 sets forth a block diagram of an example system configured for detecting coolant leaks in a server system according to embodiments of the present disclosure.

Exemplary methods, apparatus, and products for detecting coolant leaks in a server system in accordance with the present invention are described with reference to the accompanying drawings, beginning with FIG. 1. FIG. 1 sets forth a diagram of a controller 110 configured for detecting coolant leaks in a server system according to embodiments of the present invention. The controller 110 of FIG. 1 includes a microprocessor 120 which includes memory 130 and communicates via communications 140.

The controller 110 includes hardware and software that communicates and controls via communications 140. Communications 140 may be a single communications bus or may be multiple buses or may be a communications fabric or may be another communications link. Via communications 140, controller 110 controls a chassis or rack by performing configuration and monitoring tasks, controlling power and components, enabling alerts, and communicating with a user with local or remote input and output devices or by a web-based or cloud-based interface or other user interface system.

The controller 110 controls power, cooling, and other components in the chassis. More specifically, the controller 110 monitors components and powers up and powers down components, power, and cooling as needed. In the event of a detected coolant leak, the controller 110 may power down components as well as the coolant system.

Figure 2:
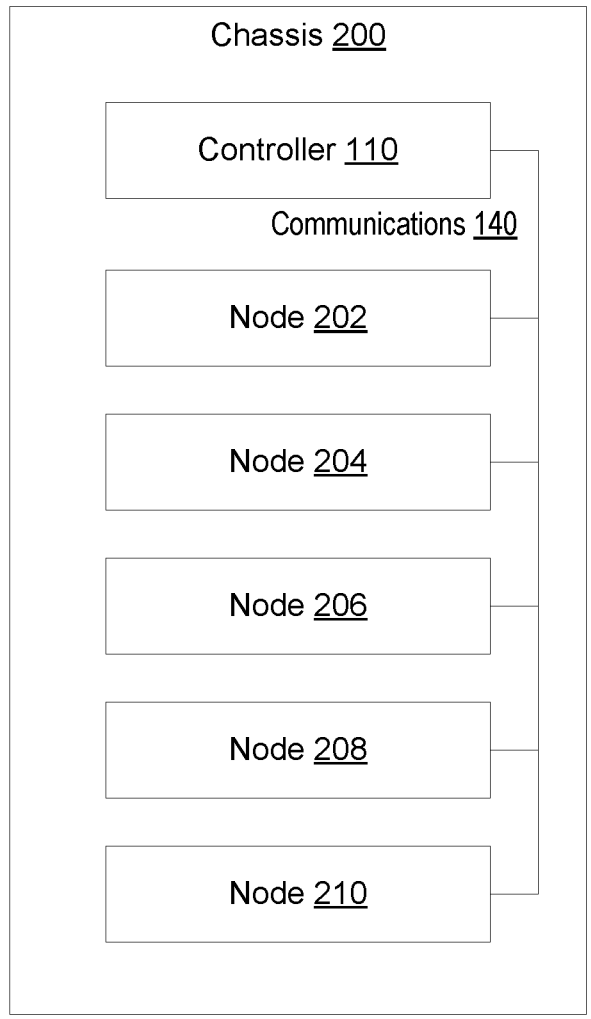
FIG. 2 sets forth a block diagram of an example system configured for detecting coolant leaks in a server system according to embodiments of the present disclosure.

For further explanation, FIG. 2 sets forth a block diagram of automated computing machinery including an exemplary controller (110) configured for detecting coolant leaks in a server system according to embodiments of the present invention. The controller (110) of FIG. 2 is housed in a chassis (200) and is in communication with nodes (202, 204, 206, 208, and 210) through communications 140.

In FIG. 2, controller (110) is a chassis management controller. Nodes (202, 204, 206, 208, and 210) are computer servers in a blade format that may include processors, memory, integrated network controllers, and storage drives in various configurations (not shown). Each node (202, 204, 206, 208, and 210) also includes a baseboard management controller that monitors the node including monitoring voltage. The baseboard management controller of each node communicates with controller (110) via communications 140. Each node (202, 204, 206, 208, and 210) uses power, cooling, networking, various interconnects and management (not shown) provided by chassis (200).

In chassis (200), five nodes are shown stacked vertically but other node configurations are possible with more nodes or fewer nodes. For example, chassis (200) may house four nodes or 8 nodes or 32 or 64 nodes or 128 nodes or 180 nodes or other number of nodes, depending upon the physical configuration of the system. The nodes may be lined up horizontally in multiple rows, in another configuration. As shown in FIG. 2, controller (110) is located at the top of chassis (200) but controller (110) may be located at the bottom of chassis (200) or elsewhere.

Figure 3:
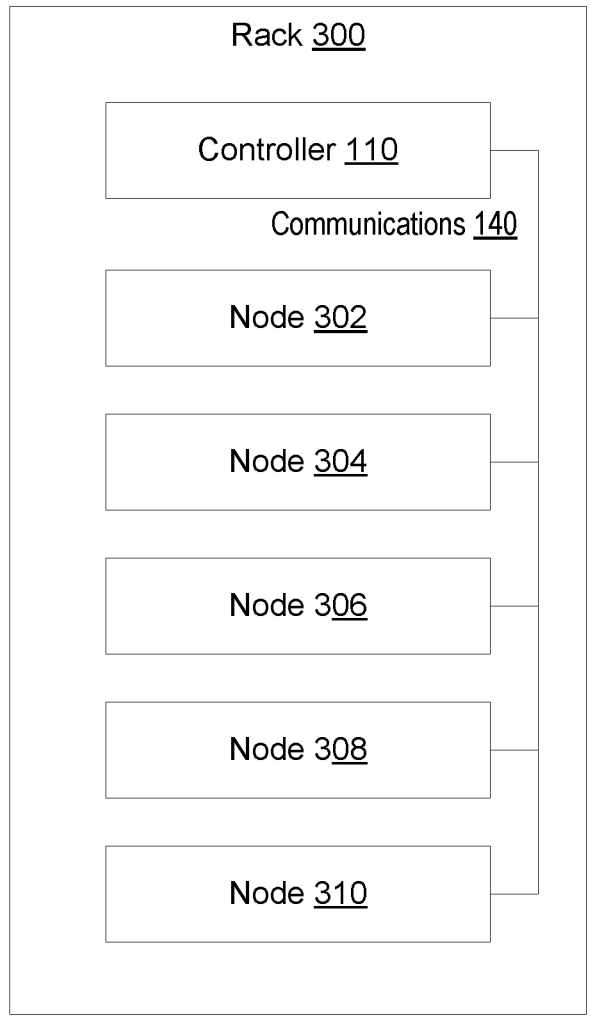
FIG. 3 sets forth a block diagram of an example system configured for detecting coolant leaks in a server system according to embodiments of the present disclosure.

For further explanation, similar to FIG. 2, FIG. 3 sets forth a block diagram of automated computing machinery comprising an exemplary controller (110) configured for detecting coolant leaks in a server system according to embodiments of the present invention. The controller (110) of FIG. 3 is housed in a rack (300) and is in communication with nodes (302, 304, 306, 308, and 310) through communications 140.

In FIG. 3, controller (110) is a rack management controller. Nodes (302, 304, 306, 308, and 310) are computer servers that may include processors, memory, integrated network controllers, power supply, and storage drives in various configurations (not shown). Each node (302, 304, 306, 308, and 310) also includes a baseboard management controller that monitors the node including monitoring voltage. The baseboard management controller of each node communicates with controller (110) via communications 140. Each node (302, 304, 306, 308, and 310) uses cooling provided by rack (300).

In rack (300), five nodes are shown stacked vertically but other node configurations are possible with more nodes or fewer nodes. For example, rack (300) may house four nodes or 8 nodes or 14 nodes or 21 nodes or 42 nodes or other number of nodes, depending upon the physical configuration of the system. The nodes may be lined up horizontally in multiple rows, in another configuration. As shown in FIG. 3, controller (110) is located at the top of rack (300) but controller (110) may be located at the bottom of rack (300) or elsewhere.

Figure 4:
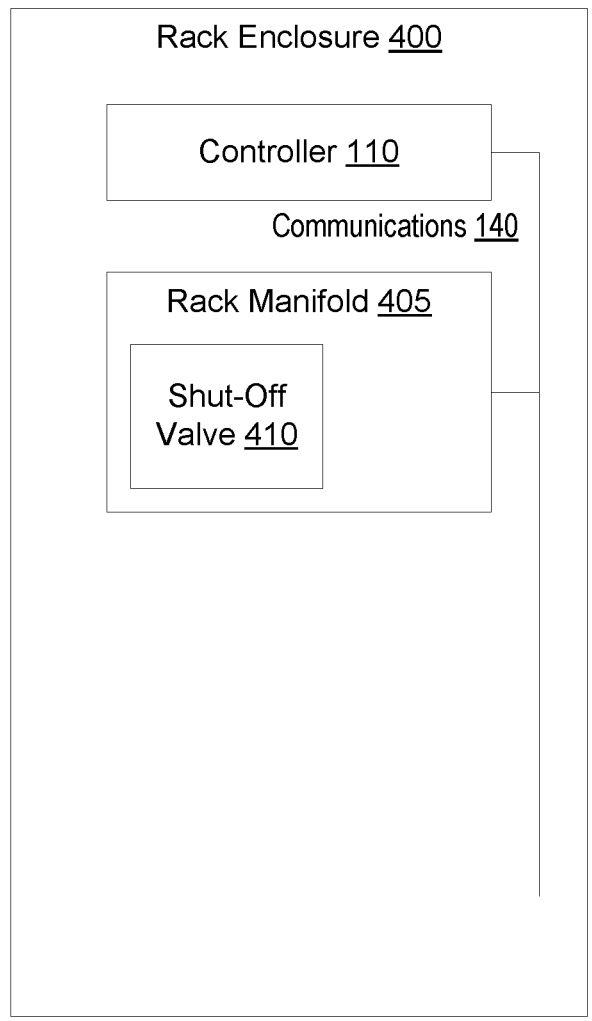
FIG. 4 sets forth a block diagram of an example system configured for detecting coolant leaks in a server system according to embodiments of the present disclosure.

For further explanation, FIG. 4 sets forth a cooling system in rack enclosure (400) configured for detecting coolant leaks in a server system according to embodiments of the present invention. Rack enclosure (400) may house a chassis and a blade server system as shown in FIG. 2 or may house a rack mounted server system as shown in FIG. 3.

Rack enclosure (400) houses a controller (110) that may be a chassis management controller or a rack management controller. Rack enclosure (400) also includes a liquid cooling system that includes a rack manifold (405) and shut-off valve (410). Shut-off valve (410) may be a solenoid shut-off valve or other type of valve. The liquid cooling system may cool using water as a coolant or may use another fluid. Shut-off valve (410) stops liquid in the event of a leak and is controlled by controller (110).

Figure 5:
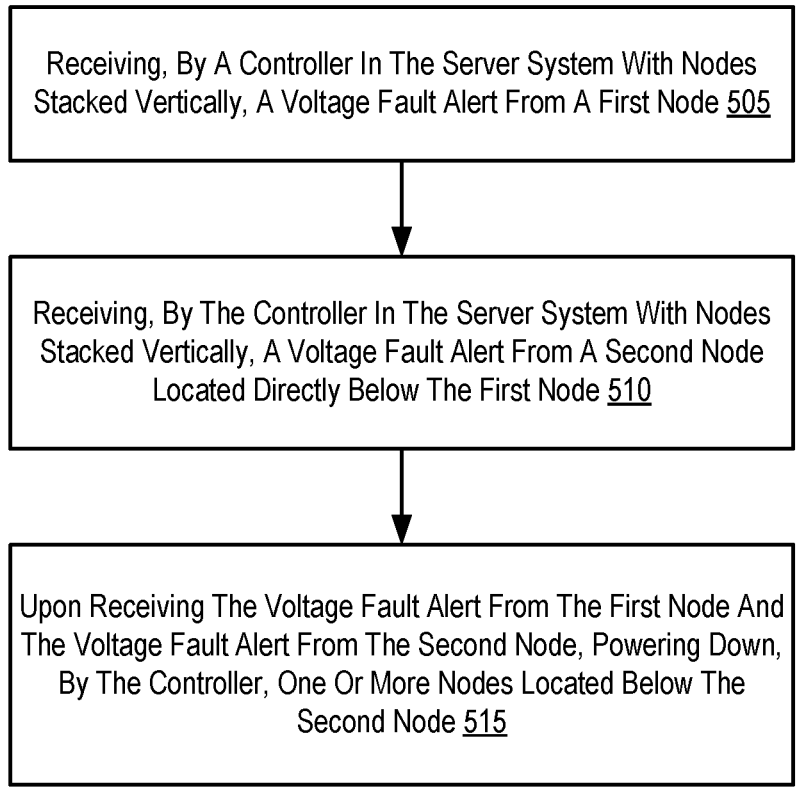
FIG. 5 sets forth a flow chart illustrating an exemplary method for detecting coolant leaks in a server system according to embodiments of the present disclosure.

For further explanation, FIG. 5 sets forth a flow chart illustrating an exemplary method for detecting coolant leaks in a server system according to embodiments of the present invention that includes receiving (505), by a controller in the server system with nodes stacked vertically, a voltage fault alert from a first node. Receiving (505), by a controller in the server system with nodes stacked vertically, a voltage fault alert from a first node includes controller (110) receiving a voltage fault alert from a first node in the server system. For example, controller (110) receives a voltage fault alert from node (204) in FIG. 2 or node (304) in FIG. 3.

FIG. 5 also includes receiving (510), by the controller in the server system with nodes stacked vertically, a voltage fault alert from a second node located below the first node. Receiving (510), by the controller in the server system with nodes stacked vertically, a voltage fault alert from a second node located below the first node includes controller (110) receiving a voltage fault alert from a second node in the server system. For example, controller (110) receives a voltage fault alert from node (206) located below node (204) in FIG. 2 or node (306) located below node (304) in FIG. 3. As described above, the nodes may be all stacked vertically or may be stacked with multiple rows of columns of nodes. A node located below the node above it is a node that is located vertically below the node above it.

FIG. 5 also includes upon receiving (515) the voltage fault alert from the first node and the voltage fault alert from the second node, powering down, by the controller, one or more nodes located below the second node. Upon receiving (515) the voltage fault alert from the first node and the voltage fault alert from the second node, powering down, by the controller, one or more nodes located below the second node includes controller (110) powering down one or more nodes below the second node. For example, controller (110) powers down nodes (208 and 210) below node (206) in FIG. 2 or nodes (308 and 310) below node (306) in FIG. 3. In a system with more nodes than the systems in FIG. 2 and FIG. 3, then controller (110) would power down one or more nodes below the second node. Powering down some or all the nodes located below the second node preserves the powered down nodes and prevents the nodes from being damaged by the detected coolant leak.

Figure 6:
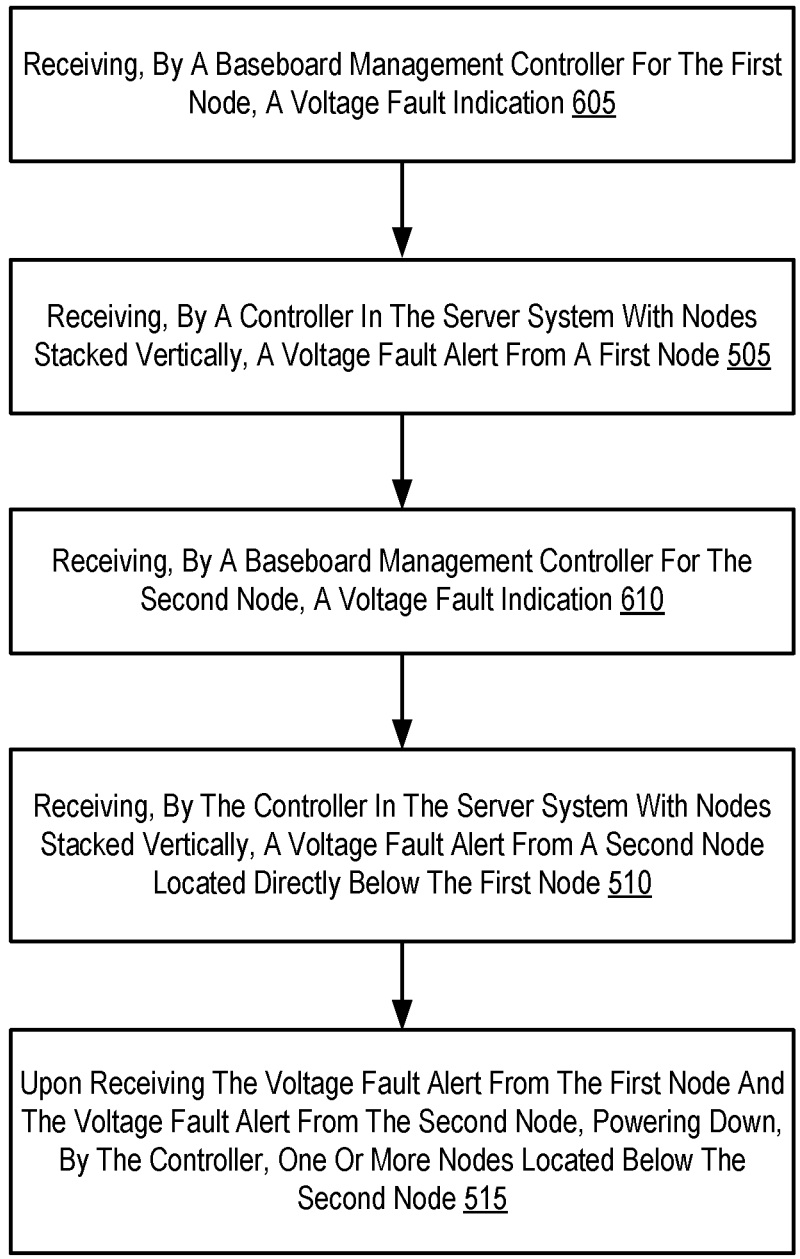
FIG. 6 sets forth a flow chart illustrating an exemplary method for detecting coolant leaks in a server system according to embodiments of the present disclosure.

For further explanation, FIG. 6 sets forth a flow chart illustrating an exemplary method for detecting coolant leaks in a server system according to embodiments of the present invention. The method of FIG. 6 includes receiving (505), by a controller in the server system with nodes stacked vertically, a voltage fault alert from a first node; receiving (510), by the controller in the server system with nodes stacked vertically, a voltage fault alert from a second node located below the first node; and upon receiving (515) the voltage fault alert from the first node and the voltage fault alert from the second node, powering down, by the controller, one or more nodes located below the second node.

The method of FIG. 6 differs from the method of FIG. 5, in that FIG. 6 includes receiving (605), by a baseboard management controller for the first node, a voltage fault indication. Receiving (605), by the baseboard management controller for the first node, a voltage fault indication includes the baseboard management controller receiving an indication of a voltage short or a voltage fault in the node. The baseboard management controller may receive the voltage fault indication from a sensor or from another source. For example, the baseboard management controller receives a voltage fault indication from node (204) in FIG. 2 or node (304) in FIG. 3.

The method of FIG. 6 further differs from the method of FIG. 5, in that FIG. 6 includes receiving (610), by a baseboard management controller for the second node, a voltage fault indication. Receiving (610), by the baseboard management controller for the second node, a voltage fault indication includes the baseboard management controller receiving an indication of a voltage short or a voltage fault in the node. The baseboard management controller may receive the voltage fault indication from a sensor or from another source. For example, the baseboard management controller receives a voltage fault indication from node (206) in FIG. 2 or node (306) in FIG. 3.

Figure 7:
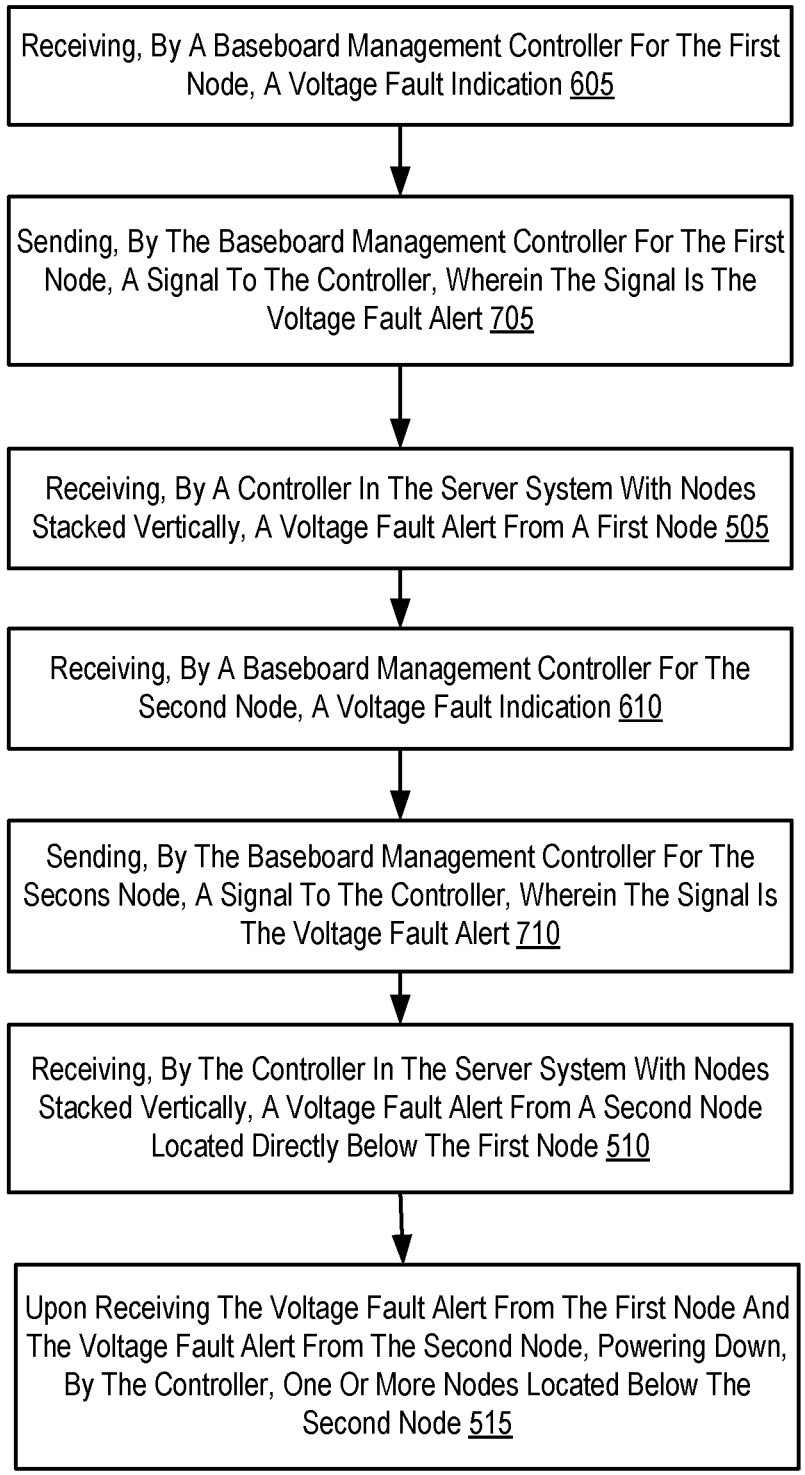
FIG. 7 sets forth a flow chart illustrating an exemplary method for detecting coolant leaks in a server system according to embodiments of the present disclosure.

For further explanation, FIG. 7 sets forth a flow chart illustrating an exemplary method for detecting coolant leaks in a server system according to embodiments of the present invention. The method of FIG. 6 includes receiving (505), by a controller in the server system with nodes stacked vertically, a voltage fault alert from a first node; receiving (510), by the controller in the server system with nodes stacked vertically, a voltage fault alert from a second node located below the first node; and upon receiving (515) the voltage fault alert from the first node and the voltage fault alert from the second node, powering down, by the controller, one or more nodes located below the second node.

The method of FIG. 7 differs from the method of FIG. 5, in that FIG. 7 includes sending (705), by the baseboard management controller for the first node, a signal to the controller, wherein the signal is the voltage fault alert. Sending (705), by the baseboard management controller for the first node, a signal to the controller, wherein the signal is the voltage fault alert includes the baseboard management controller sending the voltage fault alert to the controller. For example, the baseboard management controller sends the voltage fault alert to the controller (110) via communications (140).

The method of FIG. 7 further differs from the method of FIG. 5, in that FIG. 7 includes sending (710), by the baseboard management controller for the second node, a signal to the controller, wherein the signal is the voltage fault alert. Sending (710), by the baseboard management controller for the second node, a signal to the controller, wherein the signal is the voltage fault alert includes the baseboard management controller sending the voltage fault alert to the controller. For example, the baseboard management controller sends the voltage fault alert to the controller (110) via communications (140).

Figure 8:
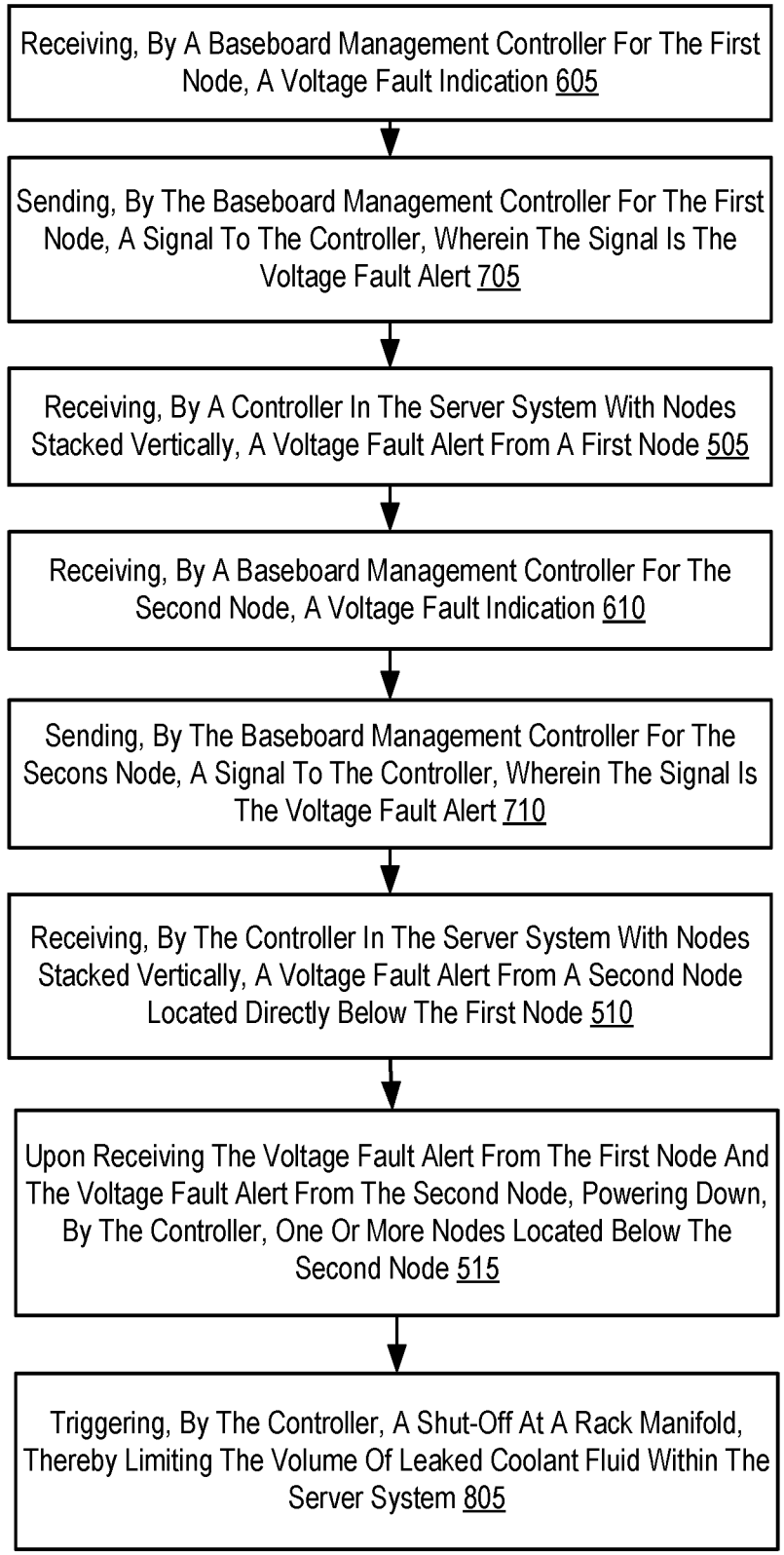
FIG. 8 sets forth a flow chart illustrating an exemplary method for detecting coolant leaks in a server system according to embodiments of the present disclosure.

For further explanation, FIG. 8 sets forth a flow chart illustrating an exemplary method for detecting coolant leaks in a server system according to embodiments of the present invention. The method of FIG. 6 includes receiving (505), by a controller in the server system with nodes stacked vertically, a voltage fault alert from a first node; receiving (510), by the controller in the server system with nodes stacked vertically, a voltage fault alert from a second node located below the first node; and upon receiving (515) the voltage fault alert from the first node and the voltage fault alert from the second node, powering down, by the controller, one or more nodes located below the second node.

The method of FIG. 8 differs from the method of FIG. 5, in that FIG. 8 includes triggering (805), by the controller, a shut-off at a rack manifold, thereby limit the volume of leaked coolant fluid within the server system. Triggering (805), by the controller, a shut-off at a rack manifold includes the controller triggering a shut-off such as a solenoid shut-off valve at the rack manifold in order to stop fluid from leaking after the coolant leak has been detected. For example, controller (110) triggers solenoid shut-off valve (410) in rack manifold (405) in order to stop coolant from leaking after the controller (110) has received voltage fault alerts from two nodes, one below the other, such as nodes (204 and 206) in FIG. 2 or nodes (304 and 306) in FIG. 3.

In view of the explanations set forth above, readers will recognize that the benefits of detecting coolant leaks in a server system according to embodiments of the present invention include:

Quickly and accurately detecting a coolant leak
Reducing damage to components

Exemplary embodiments of the present invention are described largely in the context of a fully functional computer system for detecting coolant leaks in a server system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for detecting coolant leaks in a server system, the method comprising:
    receiving, by a controller in the server system with nodes stacked vertically, a voltage fault alert from a first node;
    receiving, by the controller in the server system with nodes stacked vertically, a voltage fault alert from a second node located below the first node; and
    upon receiving the voltage fault alert from the first node and the voltage fault alert from the second node, detecting therefrom that a coolant leak is present in the server system; and
    powering down, by the controller and in response to the detected coolant leak, one or more nodes in the server system located below the second node.

2. The method of claim 1 further comprising:
    receiving, by a baseboard management controller for the first node, a voltage fault indication; and
    receiving, by a baseboard management controller for the second node, a voltage fault indication.

3. The method of claim 2 further comprising:
    sending, by the baseboard management controller for the first node, a signal to the controller, wherein the signal is the voltage fault alert; and
    sending, by the baseboard management controller for the second node, a signal to the controller, wherein the signal is the voltage fault alert.

4. The method of claim 1 further comprising:
    triggering, by the controller, a shut-off at a rack manifold, thereby limit the volume of leaked coolant fluid within the server system.

5. The method of claim 1 wherein the controller is a chassis management controller that knows where each node is located with respect to one another.

6. The method of claim 1 wherein the controller is a rack management controller that knows where each node is located with respect to one another.

7. An apparatus for detecting coolant leaks in a server system, the apparatus comprising:
    a controller in the server system with a plurality of nodes stacked vertically, the controller comprising:
    a computer processor; and
    a computer memory operatively coupled to the computer processor, wherein the controller is configured to:
        receive a voltage fault alert from a first node of the plurality of nodes;
        receive a voltage fault alert from a second node of the plurality of nodes, the second node located below the first node; and
        upon receiving the voltage fault alert from the first node and the voltage fault alert from the second node, detect therefrom that a coolant leak is present in the server system; and
        power down, in response to the detected coolant leak, one or more nodes of the plurality of nodes located below the second node.

8. The apparatus of claim 7, wherein the controller is further configured to:
    receiving, by a baseboard management controller for the first node, a voltage fault indication; and receiving, by a baseboard management controller for the second node, a voltage fault indication.

9. The apparatus of claim 8, wherein the controller is further configured to:
  sending, by the baseboard management controller for the first node, a signal to the controller, wherein the signal is the voltage fault alert; and
  sending, by the baseboard management controller for the second node, a signal to the controller, wherein the signal is the voltage fault alert.

10. The apparatus of claim 7, wherein the controller is further configured to:
  triggering, by the controller, a shut-off at a rack manifold, thereby limit the volume of leaked coolant fluid within the server system.

11. The apparatus of claim 7, wherein the controller is a chassis management controller that knows where each node is located with respect to one another.

12. The apparatus of claim 7, wherein the controller is a rack management controller that knows where each node is located with respect to one another.

13. A computer program product for detecting coolant leaks in a server system, the computer program product comprising a non-transitory computer readable medium and computer program instructions stored therein that, when executed, cause a computer to carry out the steps of:
  receiving, by a controller in the server system with nodes stacked vertically, a voltage fault alert from a first node;
  receiving, by the controller in the server system with nodes stacked vertically, a voltage fault alert from a second node located below the first node; and
  upon receiving the voltage fault alert from the first node and the voltage fault alert from the second node, detecting therefrom that a coolant leak is present in the server system; and
  powering down, by the controller and in response to the detected coolant leak, one or more nodes in the server system located below the second node.

14. The computer program product of claim 13 further comprising:
  receiving, by a baseboard management controller for the first node, a voltage fault indication; and
  receiving, by a baseboard management controller for the second node, a voltage fault indication.

15. The computer program product of claim 14 further comprising:
  sending, by the baseboard management controller for the first node, a signal to the controller, wherein the signal is the voltage fault alert; and
  sending, by the baseboard management controller for the second node, a signal to the controller, wherein the signal is the voltage fault alert.

16. The computer program product of claim 13 further comprising:
  triggering, by the controller, a shut-off at a rack manifold, thereby limit the volume of leaked coolant fluid within the server system.

17. The computer program product of claim 13 wherein the controller is a chassis management controller that knows where each node is located with respect to one another.

18. The computer program product of claim 13 wherein the controller is a rack management controller that knows where each node is located with respect to one another.

19. The computer program product of claim 13 wherein the computer readable medium comprises a storage medium.

* * * * *